UNITED STATES PATENT OFFICE.

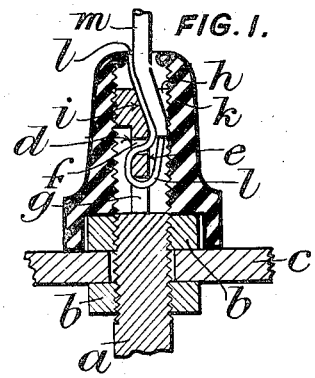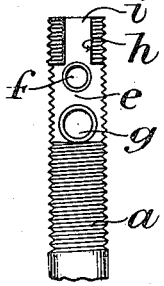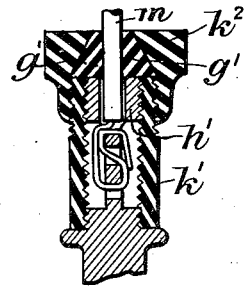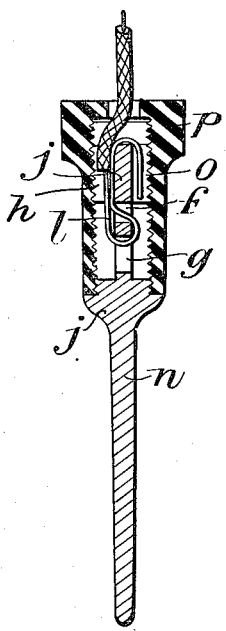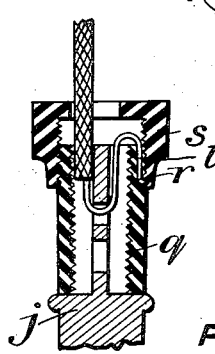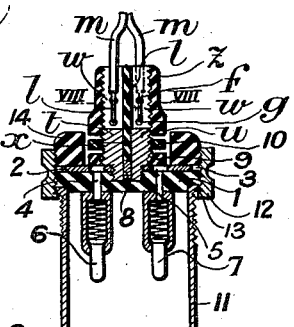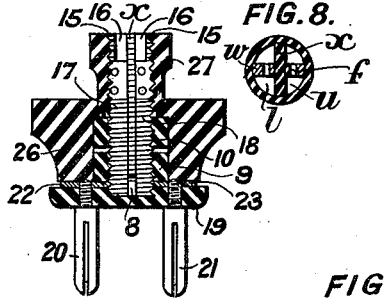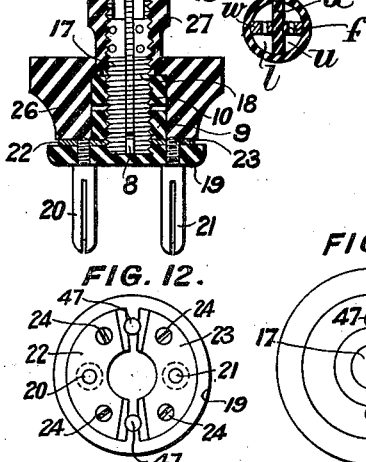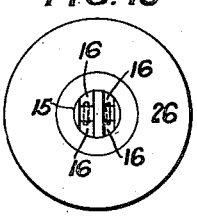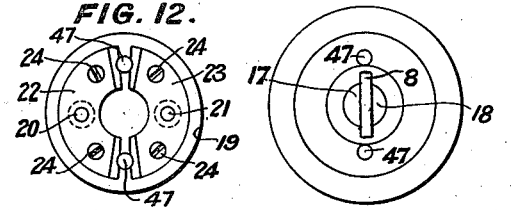

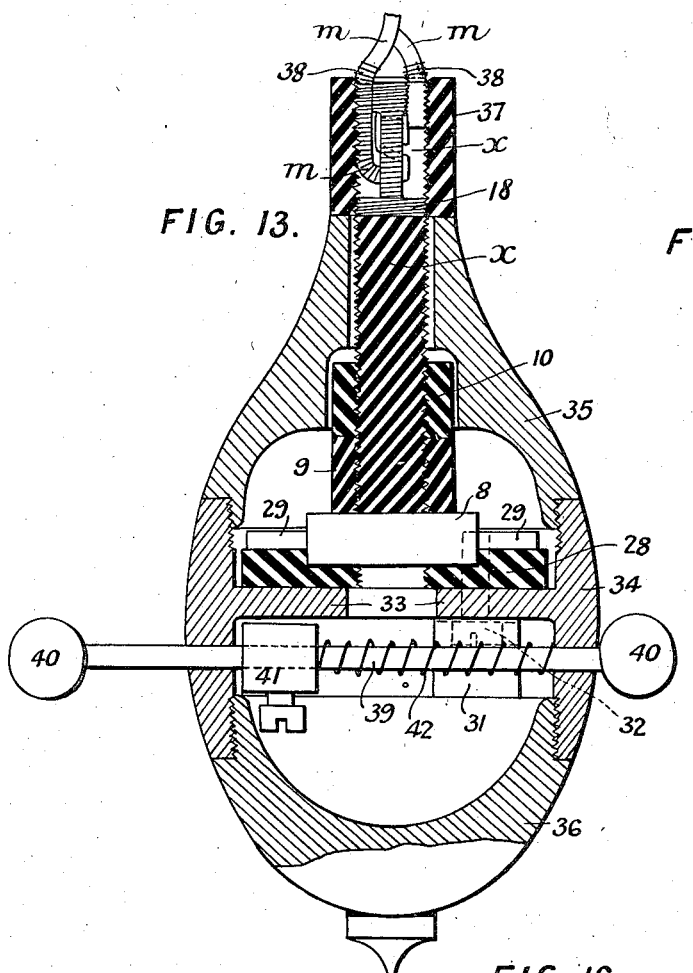

VINCENT CLIFFORD HASTINGS GIBSON, OF CAMDEN TOWN, ENGLAND.

TERMINAL FOR ELECTRIC WIRES.

1,149,437.   Specification of Letters Patent.   Patented Aug. 10, 1915.

Application filed May 15, 1913. Serial No. 767,806.

*To all whom it may concern:*

Be it known that I, VINCENT CLIFFORD HASTINGS GIBSON, subject of the King of Great Britain, and resident of " Crondall House," No. 36 Oakley Square, Camden Town, in the county of Middlesex, England, have invented new and useful Improvements in Terminals for Electric Wires, of which the following is a specification.

This invention refers to means for connecting or coupling electric conductors or wires together and to the terminals of electric batteries, lamps, wall plugs and other apparatus.

According to this invention the terminal post, contact bar or lug which is preferably screw-threaded externally, is provided externally with a recess, flat or groove on one or two sides, with a more or less longitudinal groove or hole extending from the recess to the adjacent end of the terminal post if the flat does not extend to such end, and with a transverse hole or holes through which the end of the wire, stripped of insulation, is threaded, while a perforated sleeve or cap made of or provided with insulating material is threaded on the wire and is adapted to surround the perforated part of the terminal post preferably covering the exposed portion of the wire and the end of the terminal. The cap is preferably screw-threaded internally or is made so as to fit on the screw and to not only keep the exposed portion of the wire in good electrical contact with the terminal post, but also to maintain the wire externally of the terminal axial therewith. As applied to couplings the screw or the like is similarly perforated, grooved or flattened at each end or for the whole of its length, provided with a suitable number of transverse holes and furnished with a cap or sleeve at each end or with a single sleeve to cover both connections.

Figure 1 of the accompanying drawings is a sectional elevation of a terminal stud or screw constructed according to this invention with a flexible cord or wire connected thereto. Fig. 2 is a side elevation of the terminal screw proper and Fig. 2ᴬ is a plan thereof. Fig. 3 is a sectional elevation of a modification. Fig. 4 is a part sectional elevation of another slightly modified form of the invention applied to a taper or parallel peg or tag and Fig. 5 is a plan of the contact bar and peg. Fig. 6 is a sectional elevation of another modification. Fig. 7 is a sectional elevation of a lamp holder with terminal bars constructed according to this invention. Fig. 8 is a horizontal section on the line VIII—VIII Fig. 7. Fig. 9 is a part sectional elevation of a wall plug. Fig. 10 is a plan thereof. Fig. 11 is an inverted plan with the fiber mount or plate for the pegs and the metal contact plates removed and Fig. 12 is a plan of the fiber disk or plate and the contact plates. Fig. 13 is a sectional elevation of a pear switch to a larger scale. Fig. 14 is a plan of the contact bars and Fig. 15 is a sectional elevation at right angles to Fig. 13 of part of the pear switch and Fig. 16 is a view partly in elevation, and partly in section of a coupling for wires.

According to one construction and as shown in Figs. 1, 2 and 2ᴬ the screw-threaded end of a terminal stud, bar, lug or screw $a$ is suitably provided with a nut or nuts $b$ or other fastening to fix it to a base or plate $c$ in a wall plug or to the lug of a battery, lamp or other article. Near its upper end the screw or contact bar is recessed so as to form two flats $d$ and $e$, one on each side of the screw $a$, and two holes $f$ and $g$ are also made, one above the other, through the thus flattened portion of the screw $a$, while a longitudinal groove or hole $h$ is made from the top of the flat $e$ to the adjoining end of the screw which groove or hole $h$ may be axial or somewhat inclined at $i$ to the axis. Finally a nut or cap $k$ of insulating material is provided which is perforated to take the wire and is preferably adapted to screw on to the screw-threaded end of the screw $a$, but is long enough and of sufficient diameter or is tapered at or toward the base to entirely cover the screw and the nut $b$ for fixing it to the base $c$ or other part or portion. This cap $k$ also has the function of holding the wire threaded through the holes in the screw in position and in close contact with the terminal screw or contact bar $a$.

To connect a wire, the end $l$ of the latter is as usual stripped of insulating material $m$ so as to leave the wire or flexible cord $l$ made of a number of small wires, exposed. The wire is then threaded through the cap $k$, through the lower hole $g$ in the terminal, back through the other hole $f$ and passed or laid up the longitudinal groove $h$, the cap $k$ is then screwed on and the projecting portion of the exposed wire $l$ is cut off flush with the top of the cap $k$. The perforation at the top of the cap $k$ is suitably of such an internal diameter as to approximately fit around the insulating covering $m$ of the wire or cable $l$ and in order to prevent chafing of the insulation, the outer edge or flange of the perforation is suitably rounded off and the dimensions internally of the perforated cap are preferably such as to hold the insulation of the wire against the contact bar or screw $a$ so as to form a cord grip and relieve the wire in contact of strain.

The construction shown in Fig. 3 is very similar to that just described, the only difference being that instead of the longitudinal groove $h$, the upper end of the screw is furnished with an axial hole $h^1$ the outer side of the sleeve $k^1$ is provided with a screw thread, taper cord grips $g^1$ are provided at the top and the cap $k^2$ tightens them against the insulated part $m$ of the wire.

The construction shown in Figs. 4 and 5 only differs from that shown in Figs. 1, 2 and 2$^A$ in that the terminal screw or contact bar $j$ which is made in one with a taper or parallel peg or tag $n$, is provided with a longitudinal groove $o$ on the side of the screw opposite to the groove $h$, that is to say, it is grooved on both sides. As in the previous example the wire $l$, stripped of insulation, is passed through the holes $g$ and $f$ in the flat portion of the screw and is then passed over the top of the screw and down again into the groove $o$ so that when the perforated cap $p$ of insulating material is screwed on to the screw $j$ the uncovered portion or end of the wire is entirely inclosed. The lower hole $g$ is suitably made somewhat larger than the other to allow of the insertion of another peg, tag or wire if desired.

In Fig. 6 the screw $j$, which in all respects resembles that shown in Figs. 4 and 5, is provided with an internally screw threaded sleeve $q$ made of or covered with insulating material and this sleeve is also furnished with a short axial slot $r$ into which the end $l$ of the wire may be laid. The upper end of the sleeve $q$ is also provided with an external screw thread adapted to take the perforated internally screw threaded cap $s$ made of insulating material which thus forms an additional lock to retain the wire on the terminal.

As shown in Figs. 7 and 8, there are two terminal bars $t$ and $u$, each of which is made part cylindrical and with reduced or flattened portions marked respectively $w$ and $w$. Between the two part cylindrical bars, there is a strip $x$ of fiber, vulcanite, or the like and the strip and bars together form a cylindrical body which is screw threaded externally to take the nut or internally screw threaded sleeve $z$. Each bar $t$ and $u$ is provided as in the previous examples with two holes $f$ and $g$ through which the uncovered portions $l$ of the wires are passed and the insulation $m$ of the wires is allowed to extend well into the nut or cap $z$, the insulating strip $x$ preventing the possibility of a short circuit. The two bars $t$ and $u$ are reduced in diameter at their lower ends and are screw threaded, but the strip $x$ does not extend quite to the bottom of the bars. The disk of fiber 1 or the like is provided with a screw threaded hole into which these bars are screwed and each bar makes contact with a part circular disk or plate 2 or 3 which is provided with a screw thread, which plates by screws 4 and 5 are connected to the spring plungers 6 and 7 of ordinary construction and in order to securely hold or lock the parts together a short strip or wedge 8 of insulating material is passed through the space below the strip $x$, between the bars $t$ and $u$ with its ends resting in a groove made in the fiber disk 1 and being held firmly by the nut 9 of insulating material taking on to the top of the same, while the lock nut 10, also made of insulating material, prevents the nut 9 from coming loose. The tubular lamp socket 11 is as usual provided with a flange 12 by which the internally flanged nut 13 holds the base and connected parts securely to the externally screw-threaded ring 14 resting on the contact plates 2 and 3.

The construction and arrangement of the contacts for the wall plug illustrated by Figs. 9 to 12 are very similar to that just described, and each contact bar has a small part-cylindrical portion 15 left at the top so as to leave small grooves 16 similar to the grooves $h$ and $o$ in Figs. 4 and 5. The strip $x$, the wedge 8 or insulating material the nut 9 and lock nut 10 are also similar to those previously described. The bars 17 and 18 with the strip $x$ between them are screwed into the screw threaded hole in the fiber disk 19 with the slotted metal pegs 20 and 21 therein. The part circular metal plates 22 and 23 are also provided with an internal screw thread which is adapted in each case to make good electrical contact with the threaded portion of a contact bar and the plates 22 and 23 are held fast to the disk 19 of fiber or other non-conducting material by screws 24. The pegs 20 and 21 are screw threaded at their reduced ends and screw into the contact plates 22 and 23 and the disk 19 is connected to the block 26 of fiber or other appropriate insulating material by means of screws not shown which pass through holes 47 (only shown in Figs. 11 and 12). The wedge 8 lies in the groove in the disk 19 between these two screws and obviously the contact plates 22 and 23 must not under any circumstances be close enough to touch these screws passing through the holes 47.

The nut 9 is screwed down on to the wedge 8 and the nut 10 locks the nut 9 in position. The perforated and internally flanged block 26 is then put on the terminal bars 17 and 18 and the nuts 9 and 10 and an internally threaded sleeve or cap 27 keeps the wires in close electrical contact with the contact bars 17 and 18.

Referring to Figs. 13, 14 and 15 illustrating a pear shaped switch the arrangement of bars 17 and 18, strip $x$, wedge 8 and nuts 9 and 10 is as just described. The bars 17 and 18 screw into a disk 28 of insulating material and into two part circular contact plates 29, 29 each of which is provided with a spring contact marked 31 connected by a screw 32, which passes through an internally projecting flange 33 in the body part 34 of the pear. As usual the pear is provided with an upper portion 35 and a lower portion 36 each of which is screwed to the body portion 34 and as in all previous instances an internally screw threaded cap or sleeve 37 covers the bars 17 and 18 and a portion of the insulated wires $m$ which are suitably whipped or wound with cotton silk or the like at 38 to form a cord grip, the threads of the cap biting into the whipping and forming threads thereon so that any stress on the wire is taken up by the insulated portions $m$ and is not communicated to the stripped wire passing through a hole or holes in the bars 17 and 18. Obviously, the same kind of whipping to form a cord grip may also be employed with other terminals constructed according to this invention. The body part of the pear is as usual perforated transversely for the sliding switch bar 39 having a knob 40 at each end, a contact block 41 and a spring 42.

Fig. 16 shows the coupling screw 43 which is screw threaded at each end and plain in the middle, each end being also furnished as previously described with holes, grooves and flat portions to take the wires or cables as will be apparent without further description. The central portion of the metal bar 43 is inclosed in a sleeve 44 of insulating material fitting tightly thereon and keyed thereto by a peg 45 of fiber or the like. The junction between the wires and the bar is also covered at each end by a perforated and internally screw-threaded cap or sleeve 46 and the insulated portion of the wire $m$ may also be whipped at 38 for the purpose described. It is also obvious that, if desired, instead of a sleeve at each end and a fixed sleeve in the middle, the fixed sleeve in the middle may be dispensed with and two sleeves may be employed, one at each end but butting together in the middle, or a single long sleeve may be used to cover both connections.

In cases where it is desirable to keep out moisture or water and particularly for underground or submarine cables, the whole coupling may be inclosed in a water tight casing.

What I claim as my invention and desire to secure by Letters Patent of the United States is:—

1. Means for connecting a flexible electric conductor to an electric terminal, comprising a contact bar which is transversely perforated and externally recessed intermediate its ends to allow the end of the conductor to be threaded through same, and a sleeve surrounding the perforated part of said bar, substantially as set forth.

2. Means for connecting a flexible electric conductor to an electric terminal, comprising an externally recessed and screw-threaded contact bar which is transversely perforated to allow the end of the conductor to be threaded through same, and an internally screw-threaded sleeve surrounding the perforated part of said bar, substantially as set forth.

3. Means for connecting a flexible electric conductor to an electric terminal, comprising an externally recessed and screw-threaded contact bar provided with transverse perforations through which the conductor is threaded and bent backward, and an internally screw-threaded sleeve surrounding the perforated part of said bar, substantially as set forth.

4. Means for connecting a flexible electric conductor to an electric terminal, comprising a contact bar which is externally recessed intermediate its ends and is longitudinally grooved from the recessed portion to one end of the contact bar, transverse perforations in said contact bar through which the end of the wire is adapted to be threaded, and a cap or sleeve surrounding said bar at said end, substantially as set forth.

5. Means for connecting a flexible electric conductor to an electric terminal, comprising an externally screw-threaded contact bar provided with recesses on opposite sides thereof and with transverse perforations, the recesses merging into longitudinal grooves extending to the top of the bar and the conductor being threaded through the transverse perforations and bent backward in a longitudinal groove, and an internally screw-threaded sleeve screwed on to said bar, substantially as set forth.

6. Means for connecting a flexible electric conductor to an electric terminal, comprising an externally screw-threaded contact bar provided with two oppositely arranged longitudinal grooves, a flat portion produced by two oppositely arranged flat surfaces each merging into one of the said grooves, two transverse perforations in the flat portion, through which perforations the conductor is passed and bent backward, and an externally screw-threaded sleeve screwed on to said bar, substantially as set forth.

7. Means for connecting a flexible electric conductor to an electric terminal, comprising an externally screw-threaded contact bar provided with two oppositely arranged longitudinal grooves, a flat portion produced by two oppositely arranged flat surfaces, each of which merges into one of the said grooves, two transverse perforations in the flat portion, through which perforations the conductor is passed and bent backward, and an internally screw-threaded sleeve surrounding the bar and adapted to grip the insulated covering of the conductor, substantially as set forth.

VINCENT CLIFFORD HASTINGS GIBSON.

Witnesses:
W. MORBEY,
O. J. WORTH.